April 14, 1925.  H. NEWBOLD ET AL  1,533,754
EYEGLASSES AND SPECTACLES
Filed Dec. 21, 1923    2 Sheets-Sheet 1
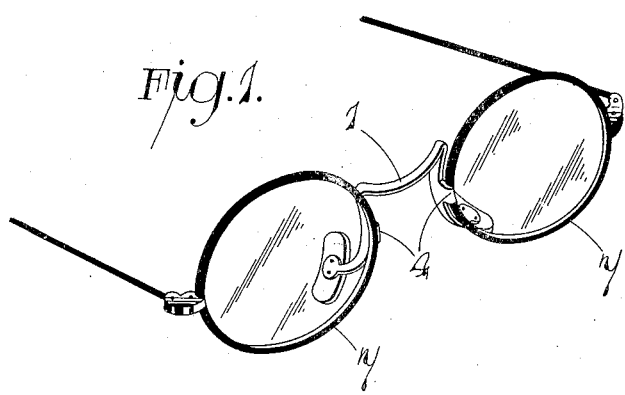
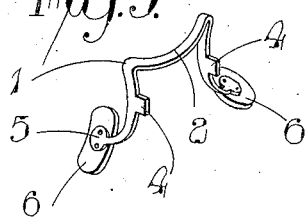
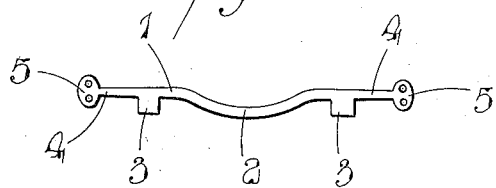
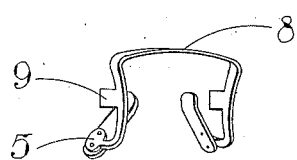
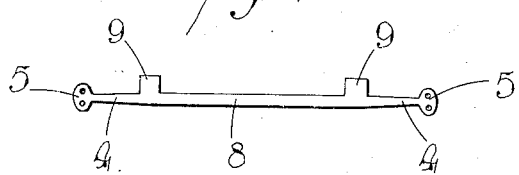
Inventors
Harry Newbold
and
Andrew James Harrison
By
B. Singer, Atty.

April 14, 1925.  
H. NEWBOLD ET AL  
EYEGLASSES AND SPECTACLES  
Filed Dec. 21, 1923  
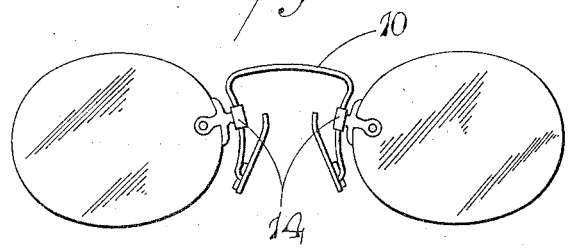
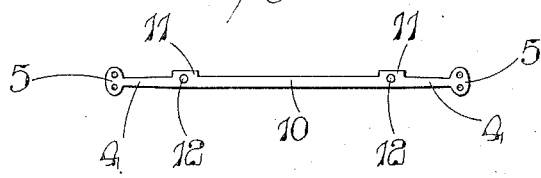
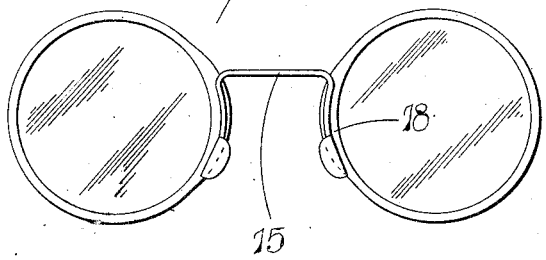
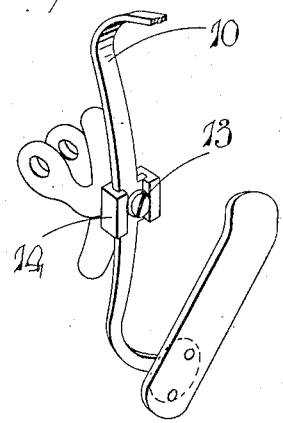
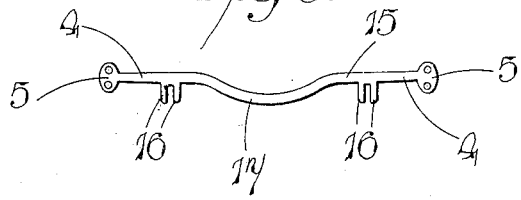
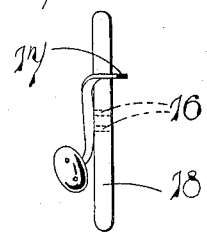

Patented Apr. 14, 1925.

1,533,754

UNITED STATES PATENT OFFICE.

HARRY NEWBOLD, OF ST. ALBANS, AND ANDREW JAMES HARRISON, OF OLTON, ENGLAND; SAID NEWBOLD ASSIGNOR TO SAID HARRISON.

EYEGLASSES AND SPECTACLES.

Application filed December 21, 1923. Serial No. 682,024.

*To all whom it may concern:*

Be it known that we, HARRY NEWBOLD and ANDREW JAMES HARRISON, subjects of the King of Great Britain, residing at St. Bernard's, Cumberland Road, St. Albans, in the county of Herts, England, and The Ferns, Olton, in the county of Warwick, England, respectively, have invented certain new and useful Improvements in Eyeglasses and Spectacles; and we do hereby declare the following to be a full, clear, and exact description of the same.

This invention relates to eyeglasses and spectacles and has for its object to provide an improved or simplified method of manufacture and including a novel form of bridge piece.

According to the present invention in the manufacture of spectacles or eyeglasses we form the bridge piece with lugs or projections at its edge or edges and we employ such lugs or projections for securing the bridge piece to the rims or straps which are to carry the glasses.

Prior to securing the bridge piece to the rims or straps, it is, of course, bent to a suitable shape. If required, the bridge piece may be provided with integral or other arms or extensions for carrying plaquet pieces for keeping the bridge clear of the bridge of the nose.

The bridge piece may be made from a sheet metal blank punched out of flat stock or it may be made from gold filled or other material in the form of oval wire. In the latter case the wire is reduced where required to provide the lugs and, when used, the plaquet holders.

Referring to the drawings:—

Figure 1 is a perspective view showing a pair of spectacles constructed in accordance with our invention.

Figure 2 is a plan view of the blank forming the bridge piece.

Figure 3 is a perspective view showing the blank after it has been bent and the plaquet pieces added.

Figure 4 is a plan view showing another blank suitable for forming a bridge piece.

Figure 5 is a perspective view showing the blank illustrated in Figure 4 after it has been bent.

Figure 6 is a front view of a pair of eyeglasses embodying another form of our invention.

Figure 7 is a perspective view showing one method of attaching the bridge piece to the strap or clip for carrying the glass.

Figure 8 is a view in plan showing the blank from which the bridge piece shown in Figure 7 was made.

Figure 9 is a plan view of a blank for constructing another form of bridge piece.

Figure 10 is a rear view of a pair of eyeglasses embodying a bridge made from the blank shown in Figure 9.

Figure 11 is a side view showing the method of attaching the bridge piece to the rims of the glasses shown in Figure 10.

In the construction illustrated in Figures 1, 2 and 3, the sheet metal blank 1 which is to form the bridge piece has a central curved portion 2 on either side of which is a lug or projection 3 extending from one edge of the blank. Beyond the projections 3 the blank is provided with extensions 4 which terminate in enlarged ends 5 which are perforated for receiving rivets.

The blank shown in Figure 2 is bent into the position shown in Figure 3 and plaquet pieces 6 are secured to the ends 5 by riveting.

The bridge piece 1 can then be secured to the rims 7 of a pair of glasses by soldering the projections 3 to the rims as shown in Figure 1.

Instead of employing a blank as shown in Figure 2, we may employ a blank as shown in Figure 4 wherein the central part 8 is straight in plan instead of being curved and the projections 9 extend backwardly instead of forwardly from the blank. The extensions 4 and their ends 5 are constructed as before. This blank is bent into the position shown in Figure 5 and the projections 9 may be secured to the rims or clips of glasses by soldering.

Another arrangement is shown in Figures 6, 7 and 8, wherein the blank 10 is provided with rearwardly extending projections 11 which are perforated at 12 for rivets. The blank 10 is provided with the extensions 4 terminating at 5 as in the previously described construction.

This blank can be used either with spectacles or rimmed glasses or rimless glasses. In either case, the blank forming the bridge piece is secured to the part carrying the glasses by a screw such as 13, and if required the parts carrying the glasses may be provided with channel shaped clips with inturned edges, as shown at 14.

Another arrangement is shown in Figures 9, 10 and 11, wherein the blank 15 is provided with two pairs of spaced projections or spikes 16. The blank is provided with the extensions 4 which terminate at 5, as in the previously described constructions and the centre part of the blank 17 may either be curved or straight.

This blank is intended primarily for use with eyeglasses or spectacles having rims made of shell or imitation shell and it is secured to such rims by passing the pairs of projections or spikes 16 through the thickness of the shell or imitation shell 18 and riveting over the ends of said projections or spikes, as shown in Figure 11.

What we claim then is:—

1. A frame for eyeglasses comprising a strip-like bridge member; a pair of spaced projections extending laterally from one edge of the bridge member in the plane of the strip; and a pair of lens holders formed separately from the bridge member and attached one to each of the projections thereon.

2. A frame for eyeglasses comprising a strip-like bridge member; a pair of spaced projections extending laterally from one edge of the bridge member in the plane of the strip; a pair of lens holders formed separately from the bridge member and attached one to each of the projections thereon; extending arms on said bridge member and separately formed plaquets secured upon said arms.

3. A frame for eyeglasses comprising a strip-like bridge member; two pairs of spaced extensions located substantially in the plane of the strip, one pair being located on the ends of the bridge member and the other pair between the ends; a pair of separately formed plaquets secured one on each of the extensions at the end of the bridge; and a pair of lens holders formed separately from the bridge member and attached one to each of the remaining projections thereon.

4. A frame for eyeglasses comprising a strip-like bridge member; two sets of projections spaced apart and extending laterally from one edge, in the plane of the strip; and a pair of lens holders formed separately from the bridge member and secured thereto by the projections on the bridge which pass through the lens holders and are riveted over at their ends.

In witness whereof we affix our signatures.

ANDREW JAMES HARRISON.
HARRY NEWBOLD.